UNITED STATES PATENT OFFICE.

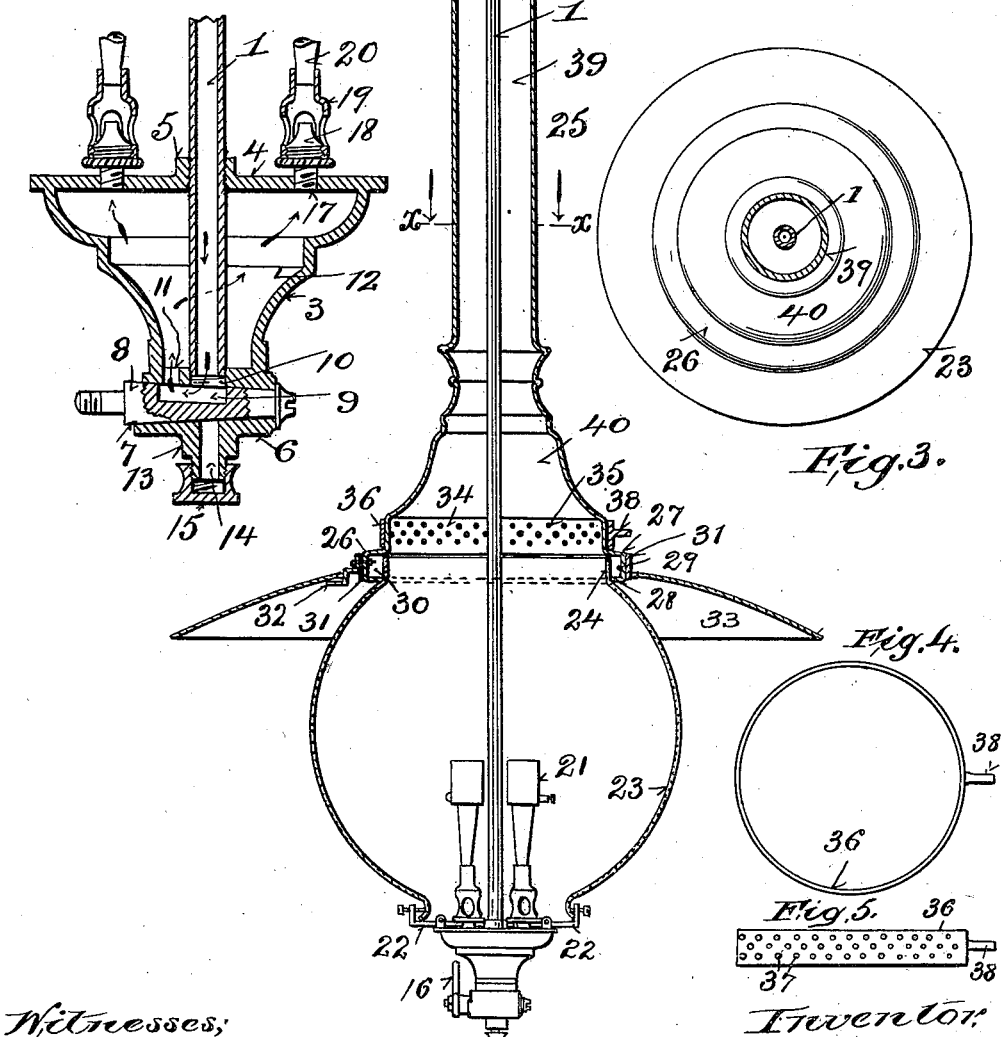

LEE T. ALTON, OF BROOKLYN, NEW YORK.

INCANDESCENT GAS-LAMP.

SPECIFICATION forming part of Letters Patent No. 703,978, dated July 8, 1902.

Application filed March 26, 1901. Serial No. 52,895. (No model.)

*To all whom it may concern:*

Be it known that I, LEE T. ALTON, a citizen of the United States, residing at the city of New York, borough of Brooklyn, county of Kings, and State of New York, have invented certain new and useful Improvements in Incandescent Gas-Lamps, of which the following is a specification.

My invention has relation to lamps wherein gas or other equivalent illuminating medium is employed in connection with a mantle for the purpose of producing an incandescent light on the system popularly known as the "Welsbach."

My invention has primarily for its object to increase the power of the induced current of air emanating from the burner of this type, to the end that the gas-pressure or speed with which the gas is fed to the burner may be accelerated and at the same time thoroughly heat the gas on its passage to the burner, thereby intensifying the light, producing a more complete admixture of air and gas, improving the quality and intensity of the light, economizing in the cost of producing the light, and at the same time reducing the temperature of the air and heated material immediately adjacent the zone of combustion.

My invention therefore consists in an apparatus by means of which the foregoing results are obtained and also in the construction and combination of parts hereinafter described, and further pointed out in the claims.

In the drawings forming part of this specification, Figure 1 is a sectional elevation of a lamp embodying my improvements. Fig. 2 is an enlarged sectional elevation of a reservoir and a group of burners of conventional form. Fig. 3 is a plan view of the lamp, taken approximately on the line *x x*, Fig. 1, looking in the direction of the arrows. Fig. 4. is a plan view of the air band or ring, and Fig. 5 is a side elevation of the same.

I have illustrated my invention in connection with a lamp comprising a series or group of burners superposed upon a reservoir and a pipe leading from a suitable source of supply of illuminating medium leading to and passing through the reservoir to a valve controlling the passage of the illuminant from the supply-pipe to the burners; but it must be understood that I do not limit myself to such a form of burner or reservoir, and any suitable or desired form of burner will answer my purposes.

In the embodiment of my invention illustrated herein, 1 is a pipe adapted to be secured to or placed in communication with a source of illuminant, as by the coupling 2, which latter may serve the additional purpose of suspending the lamp. At 3 is the reservoir of usual shape, having a crown-piece 4, provided with an apertured and threaded lug 5, through which the supply-pipe 1 passes, and an enlargement (or valve-casing) 6, having a transverse conical bore 7 for the reception of a valve 8, the enlargement constituting the casing of the valve, the valve being provided with an elongated groove 9, opening into communication with a port 10, into which the end of the supply-pipe 1 extends, and with another port 11, leading from the valve to the interior 12 of the reservoir 3. Below the valve 8 the valve-casing 6 is provided with a lug 13, having a bore 14 in line with the bore of the supply-pipe and the port 10, the end of the lug being threaded to receive a cap 15, adapted to catch the drip and to be removed to discharge the same. The end of the valve is provided with an operating-handle 16, and the valve may have the conventional stop to limit its rotation for opening and closing the passage of gas into the reservoir. Upon the reservoir is a superposed group of conventionally-constructed burners. In this special instance they comprise a nipple 17, passing through the crown-piece 4 of the reservoir, the nipple carrying an apertured gas-regulating check 18, and the apertured mixing-dome 19, an inverted conical tube 20 supporting a burner-tip 21, provided with means for supporting a suitable mantle. So far as my present invention is concerned these details of construction may be modified to suit particular conditions or requirements, the only essential to my present invention being that there shall be a burner, means for supplying the burner with an illuminant, preferably a pipe, and further means interposed between the supply and burner for regulating or checking the supply of illuminant to the burner.

At 22 are clips of any suitable construction secured to the crown-piece 4 of the burner, which clips are adapted to support an inclosing medium, such as a globe 23, preferably of glass, said globe being provided with a superposed annular rim 24. The globe is secured to the clips 22 in the usual way, such as by means of the clamping-screws generally used. Upon or above this globe is supported an elongated draft tube or chimney 25. I prefer the following construction for the same. In order to provide a substantially close fit of the draft-tube about the globe, (which tube may be made up of one piece or built up in sections of metal or other desired material, as may be most suitable for the purposes of my invention,) I form at the base thereof an annular rim 26, having upper and lower horizontal flanges 27 28 and a vertically-connecting flange 29, the horizontal flange 27 supporting the draft-tube upon the annular top or rim 24 of the globe, the lower horizontal flange 28 preferably impinging against the globe-rim, thereby providing a firm and stable support of the draft-tube upon the globe, and an annular chamber 30, within which insulating-packing can be placed for cooling or which may be left open for a cooling body of air. To the vertical web 29 of the flange may be secured another ring 31, provided with outwardly-extending arms 32 for supporting a reflector 33. Above the annular flange and preferably of the same diameter as the rim 24 of the globe is a circular or annular shoulder 34, provided with a series of apertures 35, and about this shoulder and supported upon the horizontal web 27 is a ring 36, (shown in Figs. 4 and 5,) provided with apertures 37 and a pin 38, extending therefrom, the ring being adapted to be rotated about the shoulder and bring its apertures into alinement with the apertures 35 in the shoulder to permit air to pass into the draft-tube from above the burners or be excluded therefrom by bringing the apertures in the ring out of alinement with the apertures in the shoulder in the usual manner.

At 39 is the main body or section of the draft-tube 25, which is preferably of considerable length and of markedly restricted diameter, the tubular lower end of the main body of the tube being connected with the annular shoulder 34 by a coned intermediate section 40, which may be ornamented, as illustrated. At the upper end of the main section is secured a deflector 41 to prevent currents of air passing down into the tube and for flaring the opening or exit therefrom, so as to allow easy egress of the air, and to the upper end of the tube is secured an inverted-U-shaped band 42, provided with an opening through which the supply-pipe 1 passes, which band supports a cap or cowl 43, likewise preventing down currents of air, the union securing the cap on the band and holding it firmly in place above the lower deflector. It will be noted that the supply-pipe 1 passes throughout the long and attenuated draft-tube, through the conical portion, which is quite large at its base compared with the point of connection with the main section of the tube, through the globe, which latter forms, through the means hereinbefore described, an inclosing chamber for the air immediately adjacent the burner or burners, to the reservoir, through the latter to the valve, and is placed in communication with the reservoir and burner or burners by the valve and ports hereinbefore described. The long attenuated draft-tube creates an induced current of air and gas of considerable intensity, operating upon the supply of gas or other illuminant by violently sucking it through the burners, it being considerably heated by its passage through the supply-pipe to the burners, the supply-pipe being surrounded by the rapidly passing and heated column of air, which latter being forcibly drawn up through the attenuated draft-tube constantly and rapidly keeps a supply of cool air within the globe, making more perfect the admixture of air and gas and keeping the globe and lower part of the burner comparatively cool. The ascending volume of heated air passes into the enlarged part of the conical connection when it becomes more confined and enters into the long tubular section of the draft-tube under considerable pressure and with great velocity. I prefer that the supply of air through the shoulder 34 be shut off through the medium of the ring, (and it may be permanently closed;) but under certain conditions it may be advantageous, especially for the purpose of cooling the draft-tube and where the maximum conditions may not be absolutely essential, to admit more or less of the exterior atmosphere to the draft-tube.

Having described my invention, I claim—

1. In a gas-lamp the combination with a burner, of a globe, provided with an annular rim and inclosing said burner, and a draft-tube superposed above said globe and provided with an annular channeled projection at the base thereof surrounding said rim and forming therewith an annular chamber at the top of the globe.

2. In a gas-lamp, the combination with a burner, of a globe, provided with an annular rim and inclosing said burner, a draft-tube superposed above said globe, provided with a perforated base portion and an annular channeled projection below said perforated portion surrounding said rim and forming therewith an annular air-chamber, and a circular band revolubly supported on said annular projection and provided with perforations adapted to register with the perforations in the base portion of the draft-tube for admitting air to the draft-tube when desired.

Signed in the city, county, and State of New York this 25th day of March, 1901.

LEE T. ALTON.

Witnesses:
CHAS. G. HENSLEY,
SOPHIE SEKOSKY.